United States Patent [19]

Lequien

[11] 4,400,746

[45] Aug. 23, 1983

[54] APPARATUS FOR AND METHOD OF DETERMINING TRANSVERSE POSITION OF A TRANSDUCER HEAD RELATIVE TO READ DATA TRACKS

[75] Inventor: Jean Lequien, Les Ulis, France

[73] Assignee: CII Honeywell Bull, Paris, France

[21] Appl. No.: 205,863

[22] Filed: Nov. 10, 1980

[30] Foreign Application Priority Data

Nov. 19, 1979 [FR] France .............................. 79 28421

[51] Int. Cl.$^3$ ............................................. G11B 21/10
[52] U.S. Cl. ................................................... 360/77
[58] Field of Search ...................... 360/77, 78, 44, 48, 360/49–50

[56] References Cited

U.S. PATENT DOCUMENTS

| | | | |
|---|---|---|---|
| 4,101,942 | 7/1978 | Jacques | 360/77 |
| 4,130,844 | 12/1978 | Klinger | 360/77 |
| 4,151,571 | 4/1979 | Cardot et al. | 360/77 |
| 4,208,679 | 6/1980 | Hertrich | 360/77 |
| 4,238,809 | 12/1980 | Fujiki et al. | 360/77 |

*Primary Examiner*—Alfred H. Eddleman
*Attorney, Agent, or Firm*—Lowe, King, Price & Becker

[57] ABSTRACT

The transverse position of a magnetic head relative to reference positions defining even and odd numbered axes between concentric adjacent tracks of a magnetic disc is detected. Each track includes plural position determining, longitudinally extending, equal length cells. The cells have magnetic variations which cause the head to respond to variations in cells of a pair of abutting tracks to derive a series of waveforms respectively having first and second like amplitudes and shapes for even and odd numbered cells as the tracks are translated relative to the head. The waveforms for each of the odd numbered cells include successive equal first amplitude pulses of first and second different polarities. The waveforms for each of the even numbered cells include successive equal second amplitude pulses of first and second different polarities. The number of pulses and approximate shapes of pulses for the even and odd numbered cells are the same. The first and second amplitudes indicate the transverse position of the transducer relative to the axis. In response to a determination of whether the reference axis has an even or odd number and the waveforms, the pulses are altered so both pulses of the odd numbered cells have one of the polarities and pulses of the even numbered cells have the other polarity while substantially retaining the shape and amplitude of the pulses to derive a resulting waveform. The resulting waveform is integrated over an integral number of cells to derive an indication of the transverse position relative to the axis.

21 Claims, 18 Drawing Figures

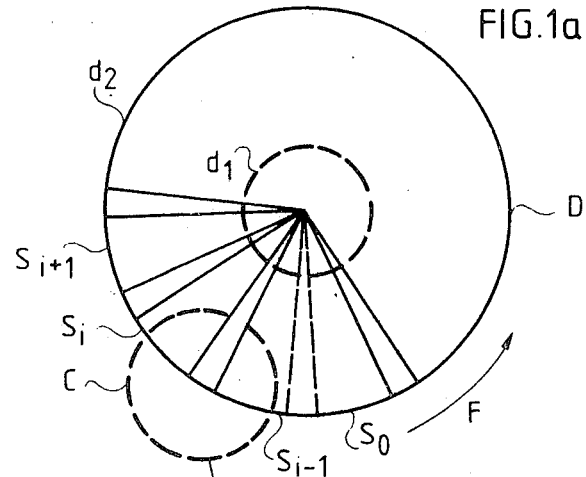
FIG.1a
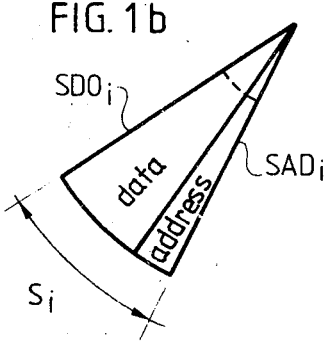
FIG.1b
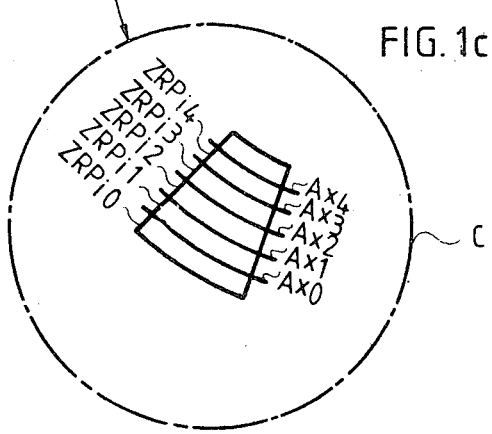
FIG.1c
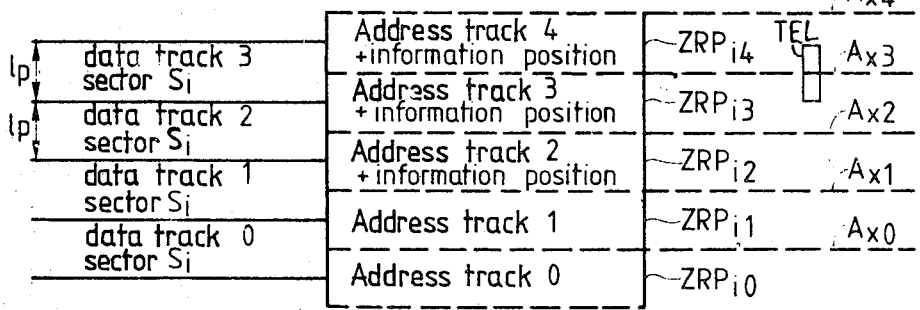
FIG.1d
FIG.1

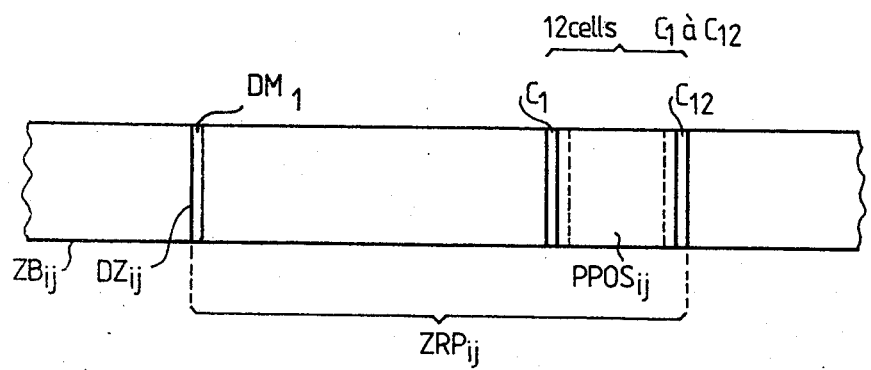
FIG. 2
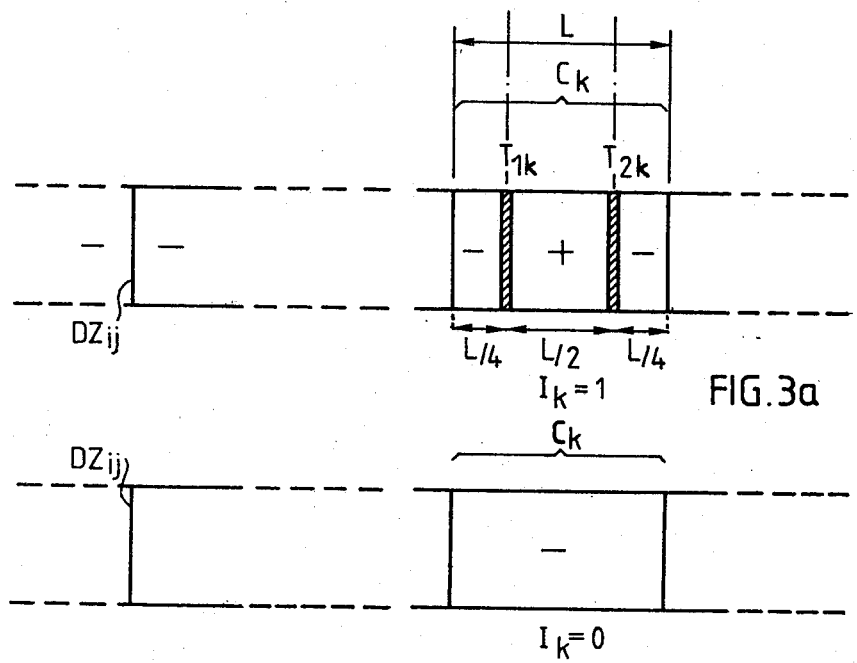
FIG. 3a
FIG. 3b
FIG. 3

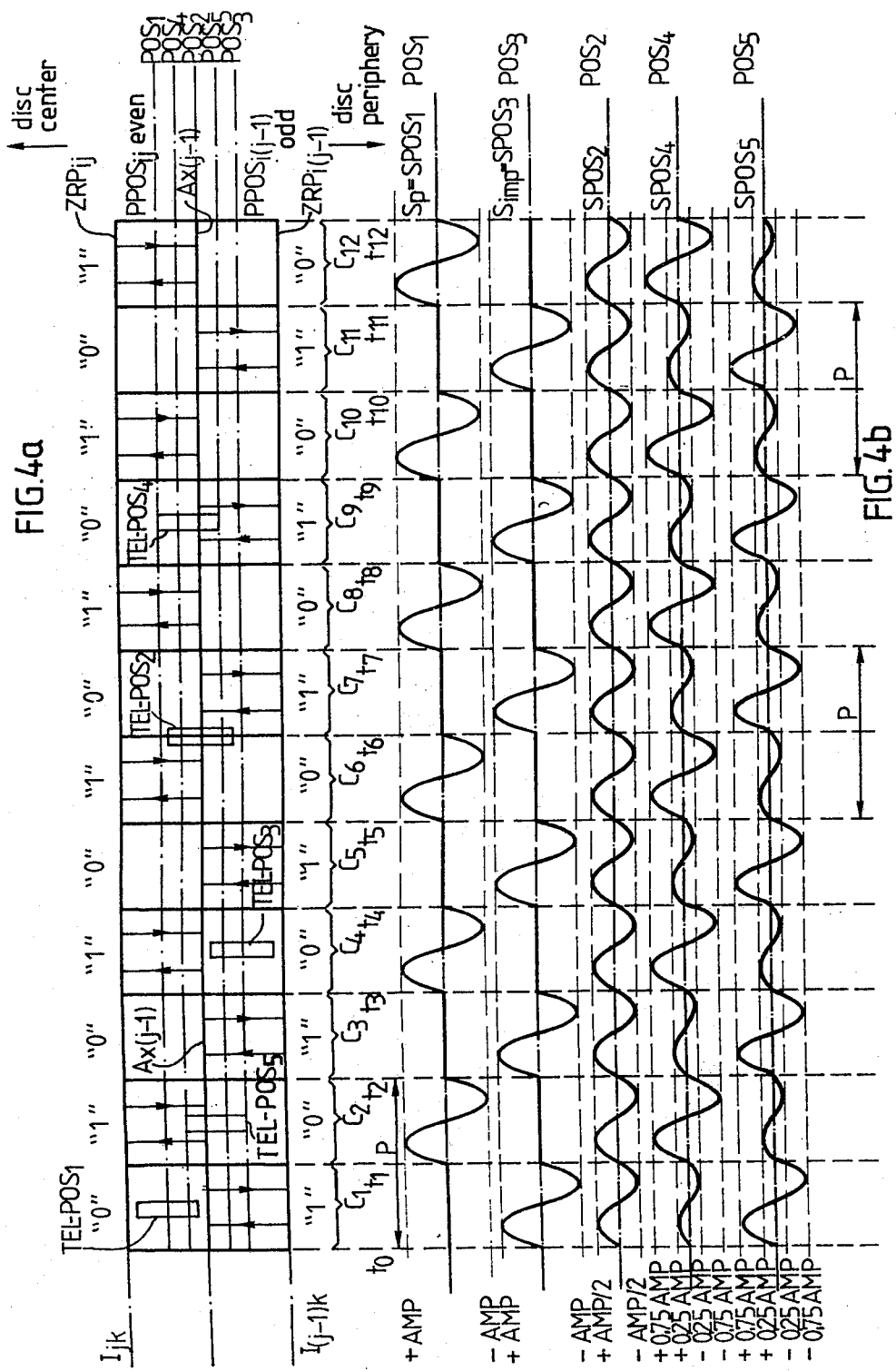

APPARATUS FOR AND METHOD OF DETERMINING TRANSVERSE POSITION OF A TRANSDUCER HEAD RELATIVE TO READ DATA TRACKS

TECHNICAL FIELD

The present invention relates generally to methods of and apparatus for detecting the transverse position of a transducer head relative to data tracks being read by the transducer and, more particularly, to such a method and apparatus wherein alternate data cells of the tracks are differentially encoded. The invention has particular application to determining the transverse position of read/write heads of disc memories used in data processing systems for enabling the position of the heads to be servo-controlled to the center of data tracks in the disc.

BACKGROUND ART

In data processing systems, magnetic disc memory systems are frequently used because they have large storage capacity and require a relatively short time for a magnetic read/write head to access data contained anywhere on discs of the memory from the moment the head receives an instruction to access the data. The magnetic discs are driven at constant rotational velocity by an electric motor.

A magnetic disc carries data, usually in binary form, on both faces of the disc in concentric circular recording tracks having a width that does not exceed a few hundredths of a millimeter. The tracks are identified by allotting them an address or serial number j (j being a whole number) from 0 to (N−1), where N is the total number of recording tracks. The tracks having addresses (j−1) and (j+1) are adjacent tracks j.

Memories having a small storage capacity contain a limited number of discs (normally only one or two). In small memories, data are stored, i.e., recorded, on each of the disc faces by setting a large amount of space aside for the data intended to be processed by the data processing system of which the memories are a part. A small amount of space is set aside for data that enables the tracks to be located; these data indicate the track addresses and enable the magnetic head to be servo-controlled to a position above the tracks. In the small area are also stored data which indicate whether or not the tracks contain faults.

For the sake of simplicity, a memory is considered which contains only a single disc. Preferably, each face of the disc is associated with a single magnetic read/write head, i.e., a magnetic read/write transducer. Current practice, as described in commonly assigned U.S. patent applicaton Ser. No. 76,332, filed on Sept. 17, 1979, entitled "Method Of Writing Information On A Magnetic Recording Medium", now U.S. Pat. No. 4,354,208, issued Oct. 12, 1982, is for the data contained on each face of the disc to be distributed over equal adjacent circular sectors $S_0, S_1 \ldots S_i \ldots S_n$. Generally, one face of a disc is divided into several tens of sectors (usually forty to fifty).

When the magnetic disc face associated with the magnetic head passes in front of the head, sectors $S_0$, $S_1$, $S_2$, etcetera, are read by the head in sequence. It is therefore said that sector $S_0$ precedes sector $S_1$, that sector $S_1$ precedes sector $S_2$, that sector $S_i$ precedes sector $S_{i+1}$ and so on. In more general terms, if two items of information $I_{k-1}$ and $I_k$ which follow one another along the same track j on the face are considered, item $I_{k-1}$ precedes item $I_k$ if item $I_{k-1}$ is read by the head before $I_k$, or that item $I_k$ follows item $I_{k-1}$. The same reasoning is applied to groups of information items $G_k$ and $G_{k-1}$ in a track (j+1) adjacent and abutting with track j.

Each sector $S_i$ is divided into two unequal areas. The larger area contains the data to be processed by the data processing system of which the disc memory is a part, while the smaller area contains data for locating the tracks and indicating faults. For the sake of simplicity, the data contained in the larger area are referred to as "data to be processed". In each sector, the smaller area is divided into a plurality of reference zones, one for each track, so each track is associated with a single reference zone.

It is recalled that a bit is a binary one or zero digit. The one or zero may be expressed on a magnetic medium or as an analog or logic electrical signal. A logic signal is capable of assuming only two values called "logic or binary zero" and "logic or binary one"; an analog signal is a signal having a voltage that may vary continuously between two positive and/or negative extreme values. Any item of data or information recorded on the disc is referred to herein as a "bit".

A magnetic head for writing information into and reading information from a magnetic disc includes a magnetic circuit comprising a high magnetic permeability material on which is mounted a winding and in which is formed an air gap. The air gap is substantially rectangular in shape, having a length much greater than its width. The gap is of the same order of magnitude as the radial width of the tracks and reference zones, which are of the same width. Thereby, the gap is responsive to magnetic flux variations representing data to be processed from a disc track have serial number j, as well as track identifying data contained in reference zones $ZRP_{ij}$ and $ZRP_{i(j+1)}$ associated with the data track having serial number j. The air gap of the head is disposed perpendicularly to magnetic axis $Ax_j$ of track j, i.e., the air gap is disposed parallel to the radial width of track j. To enable the data of track j to be read from the disc or written into the disc with maximum accuracy, the head remains stationary facing the track during the time necessary for reading or writing all or part of the data which the track contains while the disc rotates at constant velocity. The head air gap is perfectly centered on magnetic axis $Ax_j$, the boundary between reference zones $ZRP_{ij}$ and $ZRP_{i(j+1)}$. The magnetic read/write head reads or writes track identifying data in reference zones $ZRP_{ij}$ and $ZRP_{i(j+1)}$ by being disposed astride the magnetic axis separating the two reference zones.

One known method of recording data on the face of a magnetic disc involves providing a succession of elementary areas of variable length over the entire length of each track and each zone by applying magnetic fluxes to the zones by the magnetic head. Alternate areas have magnetic inductions of the same amplitude, but of opposite polarity, whereby, for example, a first area has a magnetization of $+\phi$ and the adjacent area has a magnetization of $-\phi$. The boundary between two adjacent magnetic areas which follow one another along a track or zone defines a magnetization sense change or a "magnetic transition".

There are two different types of magnetic transitions, namely: when the magnetic head passes successive magnetic areas having negative and positive induction on the disc, the magnetization sense change is positive; and, when, on the other hand, the head passes successive areas having positive and negative induction, the magnetization sense change is negative.

A preferred configuration for magnetic induction values of track identification data contained in the reference zones is described and claimed in previously mentioned U.S. Application Ser. No. 76,332. In the disc disclosed in said application, track identifying data in a reference zone is defined by the presence or absence of a pair of magnetic transitions along the length of the cell. If two such transitions occur within the cell, the first transition is of opposite polarity to the second transition to represent a first binary value. The second binary value is represented by no magnetic transitions along the length of the cell. The position data for each reference zone is contained in a part of the reference zone designated as PPOS. The nomenclature is such that a particular reference zone $ZRP_{ij}$ contains position data in part $PPOS_{ij}$. Part $PPOS_{ij}$ is preceded by another part of the reference zone that contains the address of track j.

Part PPOS contains plural (m) successive cells, each having the same length, such that alternate cells contain a double magnetic transition and intermediate cells contain no such transitions. The positional data are written identically into even and odd numbered reference zones whereby the positional data is shifted from one cell to another. Thus, for any even numbered reference zone, the cells of odd rank, i.e., the odd numbered cells, do not include a double transition while the even numbered cells do contain such a transition. In all odd numbered reference zones, the odd numbered cells contain a double transition, but the even numbered cells do not contain any transitions.

Because the even and odd numbered cells of part PPOS of any reference zone have the same length, the time that the head is over each cell in a reference zone is identical, and designated by T. In response to the head traversing part PPOS of an even numbered reference zone such that the head air gap is perfectly centered on part PPOS, the head derives a periodic output signal $S_p$ having a period P equal to 2T. During each period of the head output, the head output signal has a zero voltage during a first half-period, which occurs as the head moves past the odd numbered cells. During the second half-period, as the head moves past even numbered cells, the head output is composed of two opposite polarity pulses having substantially the same absolute magnitude AMP. In response to the air gap of the head being completely centered on part PPOS of an odd numbered reference zone, the head derives a periodic output signal $S_{imp}$ having a period P equal to 2T. During each period, signal $S_{imp}$ is composed of two analog pulses of opposite sign but of equal absolute magnitude AMP during the first half-period, i.e., as the head moves past the odd cells. During the second half-period of $S_{imp}$, while the head moves past even numbered cells within the odd numbered reference zone, the head derives a zero output signal. Thus, signals $S_p$ and $S_{imp}$ are respectively referred to as even and odd signals. Signals $S_p$ and $S_{imp}$ are thus periodic, having the same period P, and shifted in time by a half-period.

The following nomenclature is employed in the present specification: if two adjacent reference zones $ZRP_{ij}$ and $ZRP_{i(j-1)}$ are considered, either one of which may be even and the other odd, reference zone $ZRP_{ij}$ is considered to be closest to the center of the disc and to have a track number j larger than reference zone $ZRP_{i(j-1)}$; $POS_1$ designates the position of a magnetic read/write head such that the air gap is situated entirely over part $PPOS_{ij}$ of zone $ZRP_{ij}$, i.e., the air gap is perfectly centered on part $PPOS_{ij}$ of zone $ZRP_{ij}$; $POS_3$ designates the position of the magnetic head such that the head air gap is situated entirely over part $PPOS_{i(j+1)}$ of zone $ZRP_{i(j-1)}$, i.e., the head air gap is perfectly centered on part $PPOS_{i(j+1)}$; an axis between zones $ZRP_{ij}$ and $ZRP_{i(j-1)}$ is defined as $Ax_j$; when the head air gap occupies any location between the extreme positions $POS_1$ and $POS_3$, portion $X_1$ of the air gap faces the even reference zone, while portion $X_2$ of the air gap faces the odd reference zone; thus $X_1$ and $X_2$ are fractions between zero and one and $X_1+X_2=1$.

Because the head air gap is of substantially rectangular shape, the value of $X_1$ and $X_2$ is proportional to the air gap length L, in turn substantially equal to the radial width of a track. Thus, if three-quarters of the air gap length is situated above an even reference zone, $X_1=\frac{3}{4}=0.75$ and $X_2=(1\frac{1}{4})=0.25$. Signal $S_p$ derived from the head as it traverses an even numbered reference zone can be considered as the algebraic sum of an even part $S_1$ and an odd part $S_2$. Even part $S_1$ corresponds to the signals resulting from reading the positional data of the even zone which the head is traversing, while odd part $S_2$ corresponds to the signals read from the positional data of the odd zone as the head moves past portion $X_2$. For a given data item, the voltage derived from the read head varies linearly as a function of the value of X. Therefore, $S_1=X_1(S_p)$ and $S_2=X_2(S_{imp})$. Consequently, $S_T=S_1+S_2=X_1(S_p)+X_2(S_{imp})$, where $S_T$=the total output signal of the head. Thus, signals $S_1$ and $S_2$ are the same shape and have the same period P, but are shifted by one half-period (P/2) in time relative to each other.

Each period P of signal $S_T$ thus comprises:

(1) a half-period signal $S_1$ including two analog pulses of opposite polarity and equal absolute amplitude value, $X_1$ (AMP); and (2) a half-period odd signal part $S_2$ composed of two opposite polarity analog pulses having equal absolute values equal to $X_2$.

Because the average of signal $S_T$ over a complete period, as well as over an integral number of periods, is zero, the calculated integral over one period of over an integral number of periods is zero. Therefore, the location of the magnetic head from position $POS_1$ to $POS_3$ cannot be deduced by calculating the integral of signal $S_T$ or the average value of the voltage resulting from signal $S_T$.

A prior art device, disclosed in copending application, Ser. No. 186,294, filed Sept. 11, 1980, entitled "Apparatus And Method For Displacing A Movable System With Respect To A Data Carrier", and commonly assigned with the present application, enables a head of a disc memory to be displaced in a minimum possible time between a departure track and an arrival track of serial number j from which it is desired to read data to be processed. In the system disclosed in said application, when the head has been positioned with respect to axis $Ax_j$ of track j, it is necessary to keep the head astride or centered on axis $Ax_j$ so that the data read by the head from the track can be performed with maximum accuracy. By maintaining the head centered on the axis, the amplitude of signals derived from the head is maximum during the entire time while data are read from the track. Therefore, the air gap is perfectly centered on the axis, whereby $X_1=X_2=0.5$, a position designated as $POS_2$. Separations of the air gap from position $POS_2$ toward position $POS_1$ or position $POS_3$ result in greater risks of error in reading or writing data to be processed from the disc.

It is therefore extremely important to be able to precisely determine the position the head occupies, i.e., the head air gap position, from position $POS_1$ to position $POS_3$ as the head is being positioned by the displacement device on track j. When a boundary between two parts $PPOS_{ij}$ and $PPOS_{i(j-1)}$ of adjacent even and odd zones moves past the head air gap, while the head occupies any position from $POS_1$ to $POS_3$, the head or its air gap is considered as being disposed "in the neighborhood of the boundary".

It is, accordingly, an object of the present invention to provide a new and improved method of and apparatus for measuring the position of a transducer head for reading and/or writing data on a carrier with respect to a reference position of the carrier.

Another object of the invention is to provide a new and improved method of and apparatus for deriving an analog signal defining the actual position occupied by an air gap of a magnetic head reading data from a magnetic memory element wherein the head position is determined with respect to a reference position defined by a boundary between adjacent even and odd zones of the memory element.

An additional object of the invention is to provide a new and improved apparatus for and method of deriving analog data indicative of the position of a magnetic head relative to an axis between a pair of reference zones of a magnetic disc wherein the analog signal is adapted to be transmitted to a servo-control device that maintains the head astride the axis during the entire time while data to be processed are read from a data sector associated with the axis.

DISCLOSURE OF THE INVENTION

According to the present invention, all pulses of the even and odd parts $S_1$ and $S_2$ are rectified so that all pulses of part $S_1$ are of opposite polarity to the pulses of part $S_2$. A periodic signal SAS, having a period P, is thereby derived. The integral of signal SAS is calculated over an interval equal to an integral number of periods having a maximum duration equal to the time for reading all of positional data of the adjacent odd and even zones. The value of the integral for the reference position defines a zero value, referred to herein as a "zero of the integral". The value of the integral defines the position of the head relative to reference position $POS_2$, such that one value and only one value of the integral corresponds to each head position relative to the reference position.

More particularly, the invention is directed to a method of and apparatus for measuring the position of a read/write head of a magnetic recording medium with respect to a reference position of the medium. The medium includes plural tracks, each containing a sub-unit of positional data recorded within a group of reference zones. Each track is associated with at least two reference zones. The reference position is defined by a boundary between adjacent even and odd zones. The signal derived by the head in the neighborhood of the boundary is equal to the sum of an even part and an odd part, wherein each of the parts has the same period P and is shifted in time with respect to each other. The two parts correspond respectively to signals that indicate the positional data of the even and odd zones. The invention is particularly characterized by assigning all pulses of even part $S_1$ a first predetermined polarity and all pulses of the odd part $S_2$ a second predetermined polarity opposite to the first polarity, to obtain a signal SAS having the same period, P, as the sum of the periods of parts $S_1$ and $S_2$. The integral of signal SAS is calculated over an integration interval that is a multiple of P and which is associated with the time while the positional data of one zone are being read. The maximum duration of the integration interval is equal to the time for reading all of the positional data of one zone. The value of the integral defining the reference position is equal to the value of the integral for the lower limit of the integration interval. The position occupied by the head with respect to the reference position is defined by the value of the integral.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIGS. 1a-1d are schematic diagrams of a preferred topographical distribution of data on one face of a magnetic disc as known in the prior art;

FIG. 2 is a schematic diagram of the manner in which data are recorded in a reference zone on the disc of FIG. 1;

FIGS. 3a and 3b are schematic diagrams of binary one and zero cells in the reference zone of FIG. 2;

FIG. 4a is a schematic drawing indicating how positional data are distributed in adjacent odd and even reference zones of the disc of FIG. 1 wherein the even reference zone is closest to the center of the disc;

FIG. 4b includes different wave forms representing the output signal of a head reading the data from the reference zones schematically illustrated in FIG. 4a;

FIG. 5a is a schematic drawing indicating how positional data are distributed in adjacent odd and even reference zones of the disc of FIG. 2 wherein the odd reference zone is closest to the center of the disc;

FIG. 5b includes different wave forms representing the output signal of a head reading the data from the reference zones schematically illustrated in FIG. 5a;

FIGS. 6a and 6b represent wave forms derived in accordance with the present invention for enabling the position of the read/write head to be measured with respect to a reference position of the disc defined by a boundary between adjacent even and odd reference zones, wherein FIGS. 6a and 6b are respectively representative of waveforms derived from the head in response to even and off reference zones being closest to the disc center;

BEST MODE FOR CARRYING OUT THE INVENTION

Figures 5A, 5B:
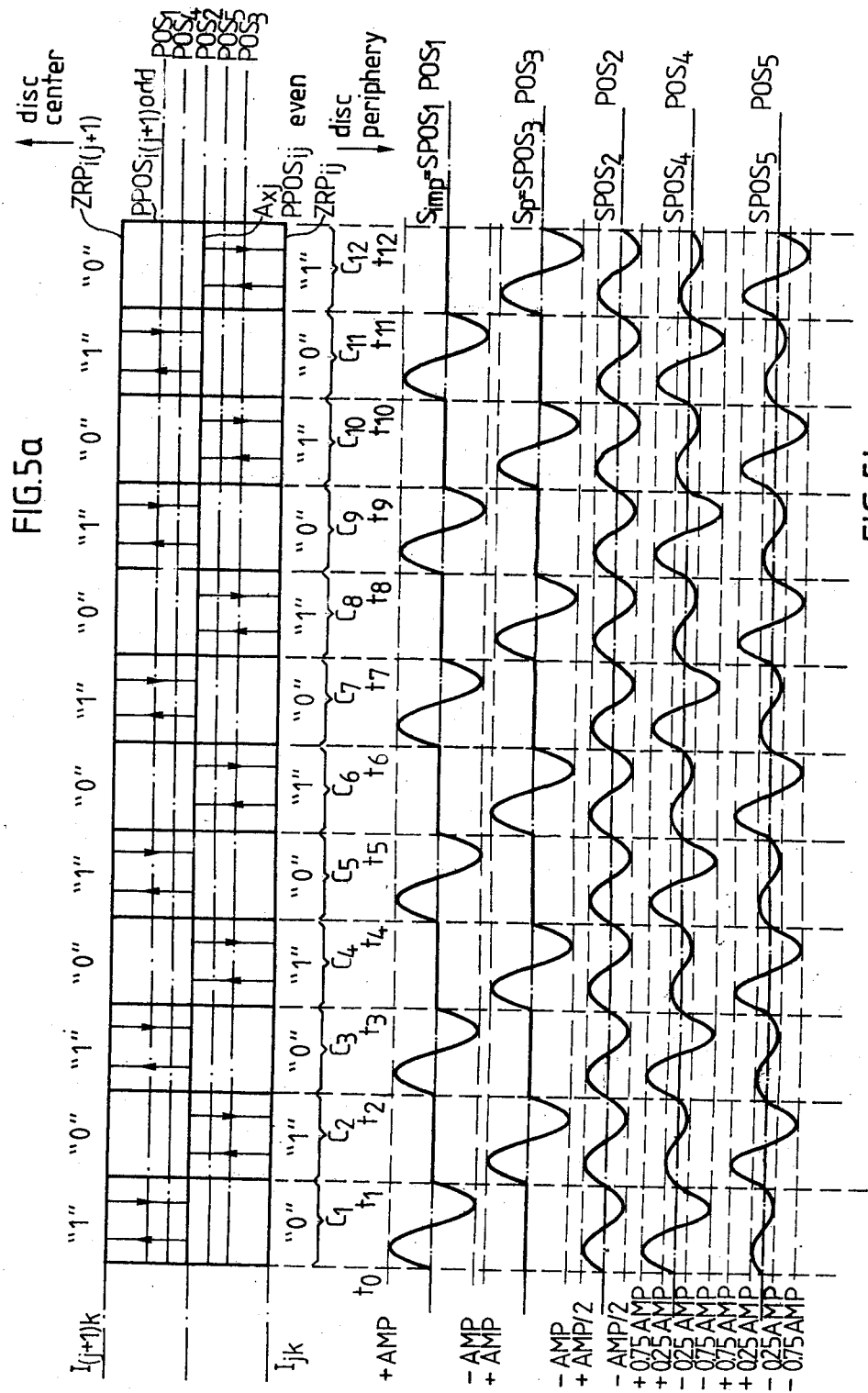

To provide a better understanding of the present invention, it is useful to review a few points of the prior art, as illustrated in FIGS. 1, 2, 3, 4 and 5 wherein there are illustrated the manner in which positional data are written within reference zones on the face of magnetic disc D and the nature of the signals supplied by the read/write head TEL when the head occupies various positions in the neighborhood of a boundary between two adjacent odd and even numbered reference zones.

Magnetic disc D, FIG. 1a, rotates counterclockwise in the direction of arrow F and has a useful recording area bounded by inner and outer circles $d_1$ and $d_2$, respectively. On disc D are defined n equal and adjacent circular sectors $S_0, S_1 \ldots S_{i+1} \ldots S_{n-1}$. As seen in FIG. 2b, each sector $S_i$ is divided into two parts $SDO_i$ and $SAD_i$ having areas such that $SDO_i$ is much larger than $SAD_i$. In part $SDO_i$ are recorded data to be processed by a data processing system of which the disc memory is a part; in part $SAD_i$ are recorded track locating data (the addresses of the tracks and the data for controlling the position of the magnetic head TEL relative to the tracks).

FIGS. 1c and 1d are enlarged views of a portion of part $SAD_i$ contained in circle C, FIG. 1a. Each part $SAD_i$ of sector $S_i$ is divided into N zones $ZRP_{i0} \ldots ZRP_{ij} \ldots ZRP_{i(N-1)}$. For the sake of simplicity only, the first five zones $ZRP_{i0}$ to $ZRP_{i4}$ are shown and are represented as rectangles. The boundaries between the various reference zones $ZRP_{ij}$ are the circular magnetic axes $Ax_j$ of the recording tracks of the magnetic disc D. In each sector $S_i$, a track having serial number j and circular axis $Ax_j$ is associated with a reference zone $ZRP_{ij}$. Thus, track 0 is associated with reference zone $ZRP_{i0}$, track 1 is associated with zone $ZRP_{i1}$ and so on.

Reference zone $ZRP_{ij}$ contains identifying data for the track of serial number j (address and position data). Thus, zone $ZRP_{i0}$ contains identifying data for the track of serial number 0, zone $ZRP_{i1}$ contains identifying data for the track of serial number 1, zone $ZRP_{i2}$ contains identifying data for the track of serial number 2, etcetera.

In FIG. 2, reference zone $ZRP_{ij}$ is illustrated as containing positional data in part $PPOS_{ij}$ of the zone as described supra. The remainder of reference zone $ZRP_{ij}$, i.e., the portion of the reference zone preceding part $PPOS_{ij}$, contains the address of the track of serial number j. Reference zone $ZRP_{ij}$ is preceded by zone $ZB_{ij}$, referred to as a white zone. White zone $ZB_{ij}$ ends part $SDO_i$ of sector $S_i$, containing data to be processed. In white zone $ZB_{ij}$, there is a uniform magnetic induction which has a predetermined polarity, such as negative. The beginning of zone $ZRP_{ij}$ is indicated by reference $DZ_{ij}$, which is constituted by a change in the magnetic induction between zone $ZRP_{ij}$ and a first magnetic area $DM_i$ of zone $ZRP_{ij}$. Typically, the magnetic polarity in zone $ZRP_{ij}$ is negative while the first magnetic area $DM_i$ has a positive magnetism. Part $PPOS_{ij}$ includes twelve cells $C_1-C_{12}$ spaced along the length of the part, whereby cell $C_1$ is encountered by head TEL prior to cell $C_2$ and cell $C_{12}$ is encountered last within part $PPOS_{ij}$. Part $PPOS_{ij}$, associated with reference zone $ZRP_{ij}$, contains position data $I_{j1}, I_{j2} \ldots I_{jk} \ldots I_{j12}$. Part $PPOS_{i(j-1)}$ associated with reference zone $ZRP_{i(j-1)}$ contains position data $I_{(j-1)1}, I_{(j-1)2} \ldots I_{(j-1)k} \ldots I_{(j-1)12}$. Part $PPOS_{i(j+1)}$, associated with reference zone $ZRP_{i(j+1)}$, contains position data $I_{(j+1)1}, I_{(j+1)2} \ldots I_{(j+1)k} \ldots I_{(j+1)12}$. Odd numbered cells $C_1, C_3 \ldots C_{11}$ of part $PPOS_{ij}$ contain position data $I_{j1}, I_{j3} \ldots I_{j11}$ having binary values equal to zero; in contrast, even cells $C_2, C_4 \ldots C_{12}$ of part $PPOS_{ij}$ contain position data $I_{j2}, I_{j4} \ldots I_{j12}$ having binary values equal to one. In contrast, the odd numbered cells $C_1, C_3 \ldots C_{11}$ of parts $PPOS_{i(j-1)}$ and $PPOS_{i(j+1)}$ contain position data $I_{i(j-1)1}, I_{i(j-1)3} \ldots I_{i(j-1)11}$ and $I_{i(j+1)1}, I_{i(j+1)3} \ldots I_{i(j+1)11}$ equal to the binary value of one, whereas even numbered cells $C_2, C_4 \ldots C_{12}$ of parts $PPOS_{i(j-1)}$ and $PPOS_{i(j+1)}$ contain position data $I_{i(j-1)2}, I_{i(j-1)4} \ldots I_{i(j-1)12}$ and $I_{i(j+1)2}, I_{i(j+1)4} \ldots I_{i(j+1)12}$ equal to the binary value of zero.

The binary one and zero values in cells $C_1, C_2 \ldots C_{12}$ of parts $PPOS_{i(j-1)}$, $PPOS_{ij}$ and $PPOS_{i(j+1)}$ are indicated by the presence of an even number of magnetic transitions or no magnetic transitions, as illustrated in FIGS. 3a and 3b. More broadly, binary zero and one bit values for a cell $C_j$ have differing numbers $N_1$ and $N_2$ of magnetic polarity transitions, where $N_1$ can include the integer zero. In the preferred embodiment, a binary one value is represented by a cell having two transitions, as illustrated in FIG. 3a, while a binary zero value is represented by a cell having no transitions, as illustrated in FIG. 3b. The binary one values are represented by cells having magnetic polarities of minus, plus and minus in first, second and third segments of each of the cells, while binary zero values are represented by cells having only a negative magnetic polarity. For convenience, the presence or absence of a double magnetic transition is referred to as a "dibit". All of cells $C_1 \ldots C_k \ldots C_n$ in a particular reference zone have the same length L. In cells representing binary one values, the first transition from minus to plus occurs one-quarter of the way through the length of the cell, while the second transition from plus to minus occurs three-quarters of the way through the cell, whereby the length of positive magnetic polarity and negative magnetic polarity in each cell is the same. Thereby, the magnetic flux induced in a head TEL reading the cell has a net value of zero, if the head is centrally positioned above a track containing the cell. The resulting wave form derived from the head for a cell $C_k$ representing a binary one value is thus approximately at 360° sinusoid with a zero average value. In response to the magnetic head passing over a cell with no transitions, which represents a binary zero value, the head produces an output wave that is substantially constant at a zero value.

Reference is now made to FIGS. 4a and 5a wherein there are illustrated the magnetic transitions in two pairs of reference zones. In FIG. 4a there are illustrated the transitions in parts $PPOS_{ij}$ and $PPOS_{i(j-1)}$ of reference zones $ZRP_{ij}$ and $ZRP_{i(j-1)}$ wherein zone $ZRP_{ij}$ is considered to be an even numbered zone and closer to the center of disc D than odd numbered zone $ZRP_{i(j-1)}$. In FIG. 5a are illustrated parts $PPOS_{i(j+1)}$ and $PPOS_{ij}$, respectively associated with odd and even numbered zones, such that odd numbered zone $ZRP_{i(j+1)}$ is closer to the center of disc D than the even numbered zone $ZRP_{ij}$. From FIGS. 4a and 5a, it is noted that alternate cells within parts $PPOS_{i(j-1)}$, $PPOS_{ij}$ and $PPOS_{i(j+1)}$ contain binary zero and one values. The twelve cells are arranged within each of parts PPOS as indicated supra.

It is thus possible to verify that in the write mode positional data contained in parts $PPOS_{ij}$ on the one hand and in parts $PPOS_{i(j-1)}$ and $PPOS_{i(j+1)}$ on the other hand is identical whether it is written into odd or even numbered zones. Between zones $ZRP_{ij}$ and $ZRP_{i(j+1)}$ is a longitudinal axis $Ax_j$, while axis $Ax_{(j-1)}$ exists between zones $ZRP_{ij}$ and $ZRO_{i(j-1)}$, FIG. 4a.

In FIG. 4a there are illustrated five different positions $POS_1$, $POS_2$, $POS_3$, $POS_4$ and $POS_5$ of head TEL transversely relative to axis $Ax_{(j-1)}$. In positions $POS_1$ and $POS_3$, head TEL is assumed to be exclusively over cells $C_1$ and $C_4$ in parts $PPOS_{ij}$ and $PPOS_{i(j-1)}$, respectively. At position $POS_2$, head TEL is assumed to be centrally located on axis $Ax_{(j-1)}$. In position $POS_4$, head TEL is assumed to be positioned so that three-quarters of the head is positioned over cell $C_9$ in part $PPOS_{ij}$ and one-quarter of the head is positioned over cell $C_9$ in part $PPOS_{i(j-1)}$. In contrast, in position $POS_5$, head TEL is assumed to be positioned so that one-quarter of the head is positioned over cell $C_2$ of part $PPOS_{ij}$, while the remaining three-quarters of the head is positioned over cell $C_2$ of part $PPOS_{i(j-1)}$. The illustrated waveforms of FIG. 4a are derived from these five different transverse relationships as the head traverses cells $C_1$–$C_{12}$. Five similar positional relationships are assumed for FIG. 5a, with the resulting waveforms of FIG. 5b being derived. It is to be understood that while head TEL is traversing a particular reference zone, it remains at a fixed position transversely of axis $Ax_j$ or axis $Ax_{(j-1)}$.

Consideration is now given to the waveforms of FIGS. 4b and 5b. When the air gap of head TEL is entirely centered on part $PPOS_{ij}$ of even numbered zone $ZRP_{ij}$, as indicated by positions $POS_1$ and $POS_3$ in FIGS. 4a and 5a, the head derives signal $S_p = SPOS_1$, FIG. 4b, and $S_p = SPOS_3$, FIG. 5b. Under such circumstances, when odd numbered cells $C_1, C_3 \ldots C_{11}$ move past head TEL, the voltage of signal $S_p$ is zero, i.e., $S_p = 0$ in the intervals $t_0 - t_1, t_2 - t_3, \ldots t_{10} - t_{11}$. In contrast, when even numbered cells $C_2, C_4 \ldots C_{12}$ move past head TEL while the head is in positions $POS_1$ (FIG. 4a) or $POS_3$ (FIG. 5a), signal $S_p$ is in the form of two analog pulses having opposite polarity and the same absolute value amplitude AMP; the waveform of the two analog pulses closely resembles that of one cycle of a sinusoid which is derived in each of the intervals $t_1 - t_2, t_3 - t_4 \ldots t_{11} - t_{12}$. Thus, signal $S_p$ is periodic, having a period $P = t_2 - t_0 = t_4 - t_2 = \ldots t_{12} - T_{10}$. The average value of signal $S_p$, calculated over a time interval equal to an integral number of periods, is zero.

When the air gap of head TEL is entirely centered on part $PPOS_{i(j-1)}$ or $PPOS_{i(j+1)}$ of odd numbered zero $ZRP_{i(j-1)}$ or $ZRP_{i(j+1)}$, respectively corresponding to positions $POS_3$ (FIG. 4a) and $POS_1$ (FIG. 5a), the head derives a signal $S_{imp}$ equal to $SPOS_3$ (FIG. 4b) or $SPOS_1$ (FIG. 5b). Signals $S_{imp}$, (FIGS. 4b and 5b) have the same wave shape as signals $S_p$, but are displaced from signals $S_p$ by the period of one cell, the period $t_1 - t_0$. Thus, in response to head TEL being at position $POS_3$ and moving past the twelve position indicating cells, six one cycle sinusoids are derived as the head moves past the odd numbered cells, while a zero voltage is derived from the head as it moves past the even numbered cells. Signal $S_{imp}$, like signal $S_p$, is periodic, having a period $P = t_2 - t_0 = t_4 - t_2 = \ldots t_{12} - t_{10}$. The average value of signal $S_{imp}$ over an interval equal to an integral number of periods P is zero.

When the air gap of head TEL is perfectly centered on boundary $Ax_j$ or axis $Ax_{(j-1)}$, as indicated by position $POS_2$ (FIGS. 4a and 5a), the head derives an output signal $SPOS_2$ that is of approximately sinusoidal form. Signal $SPOS_2$ is formed by a set of positive and negative analog pulses of equal amplitude, having an absolute magnitude of 0.5 AMP. While head TEL is precisely positioned on an axis, it derives a signal having a period P/2. Head TEL derives a signal having a period P/2 while it passes over the positional cells only while it is positioned precisely on an axis. The average value of signal $SPOS_2$ derived while head TEL is precisely centered on the axis is zero over the interval of an integral number of P/2 periods.

When head TEL occupies a position such that the larger part of the air gap surface is situated above part $PPOS_{ij}$ of an even numbered zone corresponding to position $POS_4$ (FIG. 4a) or position $POS_5$ (FIG. 5a), the head derives output signal $SPOS_4$ (FIG. 4b), or signal $SPOS_5$ (FIG. 5b). Signals $SPOS_4$ (FIG. 4b) and $SPOS_5$ (FIG. 5b) are of the same wave shape and phase. In particular, for the odd numbered cells $C_1, C_3 \ldots C_{11}$ the signal is approximately one cycle of a sinusoid, including two opposite polarity pulses of absolute magnitude amplitude equal to 0.25 AMP, with the positive going pulse preceding the negative going pulse. In the even numbered cells $C_2, C_4 \ldots C_{12}$, the waveform is of approximately sinusoidal shape, with a positive pulse preceding a negative pulse, and the absolute magnitude of the two pulses being 0.75 AMP. The amplitudes 0.25 AMP and 0.75 AMP in the odd and even numbered cells of signals $SPOS_4$ (FIG. 4b) and $SPOS_5$ (FIG. 5b) are derived because one-quarter of head TEL is considered to be over the odd numbered parts $PPOS_{i(j-1)}$ and $PPOS_{i(j+1)}$, while three-quarters of the head is over even numbered parts $PPOS_{ij}$. When head TEL is positioned at position $POS_5$ (FIG. 4b) and $POS_4$ (FIG. 5b), the head derives waveforms $SPOS_5$ (FIG. 4b) and $SPOS_4$ (FIG. 5b). Signal $SPOS_5$ (FIG. 4b) has the same wave shape and frequency as $SPOS_4$ (FIG. 4b), but is displaced from signal $SPOS_4$ (FIG. 4b) by the time required for head TEL to move through the length of one positional cell C. A similar relationship exists between the wave forms of signals $SPOS_4$ (FIG. 5b) and $SPOS_5$ (FIG. 5b). Thus, the waveforms of signals $SPOS_4$ and $SPOS_5$, in both FIGS. 4b and 5b, have an identical period P equal to the duration required for head TEL to traverse a pair of adjacent cells. The average value of waveforms $SPOS_4$ and $SPOS_5$ in both of FIGS. 4b and 5b is zero over an integral number of periods P.

In general, therefore, head TEL derives a signal $SPOS_m$ when it occupies position $POS_m$ in the range from $POS_1$ to $POS_3$; signal $SPOS_m$ equals $S_1 + S_2 = x_1 (S_i) + x_2 (S_{imp})$, such that $(x_1 + x_2) = 1$, $x_1$ and $x_2$ respectively indicating the proportion of the surface of the head air gap respectively facing part $PPOS_{ij}$ of an even numbered zone and part $PPOS_{i(j-1)}$ or $PPOS_{i(j+1)}$ of an odd numbered zone. Thus, for positions $POS_4$ (FIG. 4b) or $POS_5$ (FIG. 5b), $x_1 = 0.75$ and $x_2 = 0.25$. In the intervals while head TEL is traversing the odd numbered cells, that is, intervals $t_0 - t_1, t_2 - t_3$, etcetera, $SPOS_m = 0.75 (S_i) + 0.25 (S_{imp})$ so that $SPOS_m = 0.25 S_{imp}$. In particular, when a positive pulse of signal $S_{imp}$ reaches a maximum amplitude of $+AMP$, $SPOS_1 = 0.25$ (AMP). It can also be shown that in the intervals $t_1 - t_2, t_3 - t_4$, etcetera, $SPOS_m = 0.75 (S_i)$ because $S_{imp}$ is equal to zero during these intervals. Identical reasoning can be applied for position $POS_m$ corresponding to position $POS_5$ (FIG. 4b) and position $POS_4$ (FIG. 5b), to show that $SPOS_m = 0.75(S_{imp})$ in the intervals $t_0 - t_1, t_2 - t_3$, etcetera, and that $SPOS_m = 0.75 (S_i)$ in the intervals $t_1 - t_2, t_3 - t_4$, etcetera. It is clear that the value of the integral of signal $SPOS_m$, as represented by any of the waveforms in FIGS. 4b and 5b, is zero when calculated over an integral number of periods P.

Figure 6A:
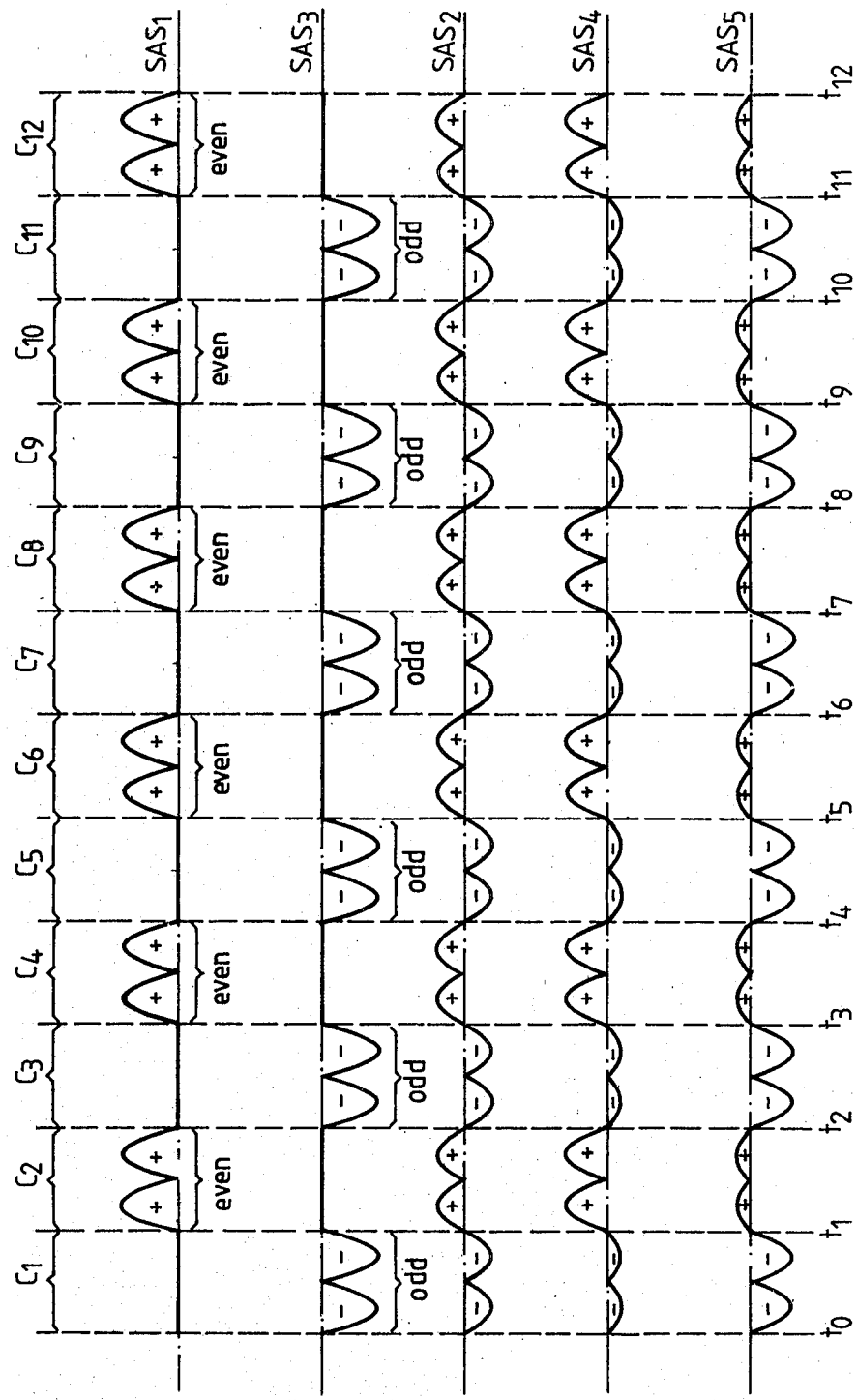
Figure 6B:
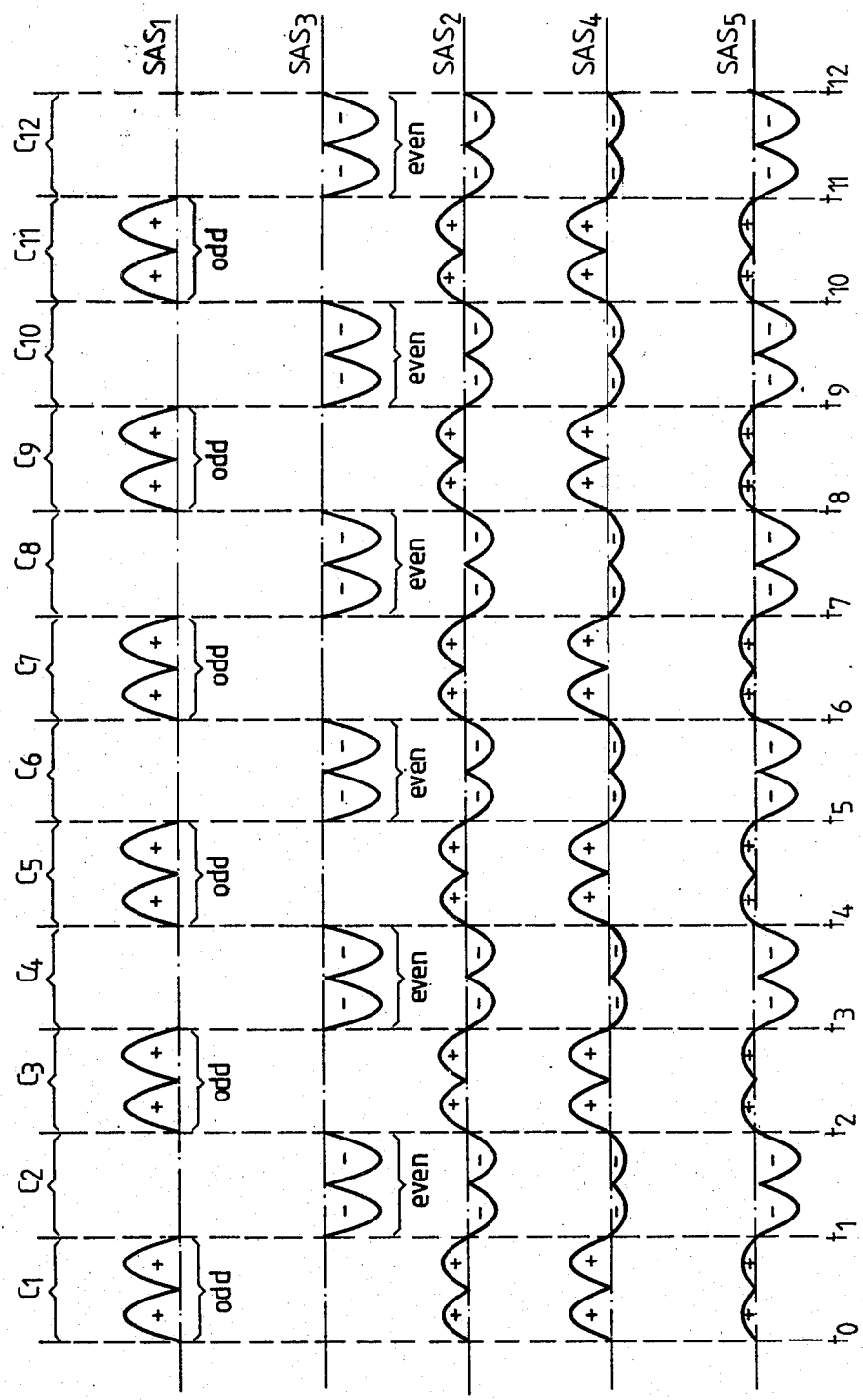
Figure 7:
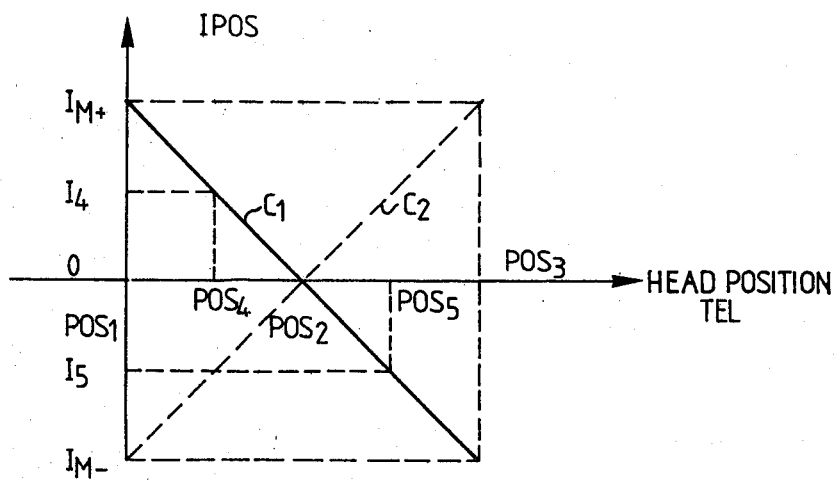
FIG. 7 is a chart indicating the variation of the integral which indicates the head position as a function of the reference position, while the head is in the neighborhood of the reference position.

FIGS. 6a and 6b are waveforms and FIG. 7 is a chart which are helpful in describing the method of measuring the position of head TEL with respect to a reference position defined by axis $Ax_{(j-1)}$ or axis $Ax_j$, regardless of whether the head position is relative to an even numbered zone $ZRP_{ij}$ or an odd numbered zone, such as $ZRP_{i(j-1)}$ or $ZRP_{i(j+1)}$. According to the method of the invention, if a reference position is defined by an odd numbered axis $Ax_{(j-1)}$ or $Ax_{(j+1)}$, i.e., an axis of a zone having an odd serial number, such that $ZRP_{i(j=1)}$ or $ZRP_{i(j+1)}$ as illustrated in FIGS. 4a, 5b and 6a, all of the analog pulses associated with even part $PPOS_{ij}$ of signal $SPOS_m$ are assigned the same polarity, e.g., positive. In other words, all analog pulses of signal $SPOS_m$ in the intervals $t_1-t_2$, $t_3-t_4$ . . . $t_{11}-t_{12}$ are considered as being positive. All of the analog pulses of an odd part, such as part $PPOS_{i(j-1)}$ or $PPOS_{i(j+1)}$, of signal $SPOS_m$ are assigned a second polarity, for example a negative polarity, opposite to that of the pulses of the even part $PPOS_{ij}$ of signal $SPOS_m$. In other words, all of the pulses of signal $SPOS_m$ in the intervals $t_0-t_1$, $t_2-t_3$ . . . $t_{10}-t_{11}$ are considered as negative. Thus, signal $SPOS_m$, FIG. 4b, is transformed into signal $SAS_m$, FIG. 6a, such that signals $SPOS_1-SPOS_5$ are transformed into signals $SAS_1-SAS_5$, respectively.

An opposite set of ground rules is established if the reference position is defined by an even numbered axis $AX_j$, associated with an even numbered reference zone $ZRP_{ij}$. This is the situation illustrated in FIGS. 5a, 5b and 6b. In this situation, each of the analog pulses of the odd numbered cells is assigned a first polarity, for example positive. In other words, all of the analog pulses of signal $SPOS_m$ in the intervals $t_0-t_1$, $t_2-t_3$ . . . $t_{10}-t_{11}$ are considered as positive. In contrast, each of the analog pulses associated with the even numbered cells is assigned the same second polarity, for example negative, opposite to the polarity assigned to the pulses of the odd numbered cells of signal SPOS. In other words, all of the analog pulses in signal $SPOS_m$ in the intervals $t_1-t_2$, $t_3-t_4$ . . . $t_{11}-t_{12}$ are considered as being negative. Thus, signal $SPOS_m$, FIG. 5a, is transformed into signal $SAS_m$, FIG. 6b, such that signals $SPOS_1-SPOS_5$ are transformed into signals $SAS_1-SAS_5$, respectively.

It is thus seen that if the reference axis has an odd number, such as axis $Ax_{(j-1)}$, FIG. 4a, all pulses in the odd numbered cells are of a first polarity (assumed negative), while all pulses in the even numbered cells are of a second polarity (assumed positive); this is the situation illustrated by FIGS. 4a, 4b and 6a. In contrast, if the axis has an even numbered, $Ax_j$, the pulses in the even numbered cells have a second polarity (assumed positive), while the pulses in the odd numbered cells have the first polarity (assumed negative); this is the situation illustrated in FIGS. 5a, 5b and 6b.

Generalizing, it is seen that all pulses of an even part $S_1$ of signal $SPOS_m$ are assigned a first polarity and all pulses of an odd part $S_2$ of signal $SPOS_m$ are assigned the same second polarity, opposite to the first polarity. This nomenclature is correct for even part $S_1$ and odd part $S_2$.

After the output signal of head TEL has been rectified as stated, the signal is integrated over an interval equal to an integral number of periods P. The maximum integration interval is from $t_0$ to $t_{12}$, i.e., six periods P. The integration interval remains the same regardless of which of parts $PPOS_{ij}$, $PPOS_{i(j-1)}$ or $PPOS_{i(j+1)}$ is in the neighborhood of head TEL as it is being translated relative to the cells. By definition, the value of the integral for the reference position defines the zero of the integral, i.e., the value of the integral for the lower limit of the integration interval is zero. The integral of signal $SAS_m$, as calculated over the integration interval, is equal to IPOS.

The value of signal IPOS as a function of the position $POS_m$ of head TEL relative to axis $Ax_j$ or $Ax_{(j+1)}$ or $Ax_{(j-1)}$ is indicated in the chart of FIG. 7. The chart of FIG. 7 is based upon an analysis of FIGS. 6a and 6b which indicates that the same curve indicative of the variation of the integral IPOS as a function of position $POS_m$ can be used for the same position $POS_m$. Thus, the integral always has the same polarity with the same absolute value for the same position $POS_m$. In addition, the priority selection indicated by FIGS. 6a and 6b for the even and odd parts $S_1$ and $S_2$ of signal $SPOS_m$, as well as for the reference position defined by axis $Ax_{(j-1)}$ or axis $Ax_{(j+1)}$, results in the same integral that occurs for a track at reference position defined by axis $Ax_j$. For head position $POS_1$, the rectified signal $SAS_1$ in FIGS. 6a and 6b, when integrated over the interval of an integral number of periods P, results in a positive maximum value $I_m+$; in contrast, for position $POS_3$, the rectified signal is indicated by waveform $SAS_3$ in FIGS. 6a and 6b. Signal $SAS_3$ in FIGS. 6a and 6b, when integrated over an interval equal to an integral number of periods P has a negative value with a maximum absolute magnitude, designated as $I_m-$, whereby $|I_{M+}|=|I_{M-}|$. When head TEL is positioned so that the air gap is precisely positioned on axis $Ax_j$ or $Ax_{(j-1)}$ or $Ax_{(j+1)}$, the rectified signal is indicated in FIGS. 6a and 6b by waveforms $SAS_2$. Waveforms $SAS_2$, when integrated over an integral number of periods P, have a zero value. In intermediate positions of head TEL, such as positions $POS_4$ and $POS_5$, the rectified head output signal is as indicated by waveforms $SAS_4$ and $SAS_5$, FIGS. 6a and 6b. Waveforms $SAS_4$ and $SAS_5$ (FIG. 6a) are rectified replicas of the head output voltage when an odd numbered axis $Ax_{(j-1)}$ or $Ax_{(j+1)}$ is the reference axis. In contrast, waveforms $SAS_4$ and $SAS_5$ (FIG. 6b) are the rectified replicas of the output of head TEL when even numbered axis $Ax_j$ is the reference axis. Integration of waveforms $SAS_4$ in FIGS. 6a and 6b over an integral number of periods P results in a positive intermediate amplitude $I_4$, while integration of waveforms $SAS_5$ in FIGS. 6a and 6b over an integral number of periods P results in an amplitude $I_5$. Because of the position of head TEL relative to axes $Ax_j$ and $Ax_{(j-1)}$ being the same, the amplitudes $|I_4|=|I_5|$ but $I_4$ has a positive value, while $I_5$ has a negative value.

Figure 8A:
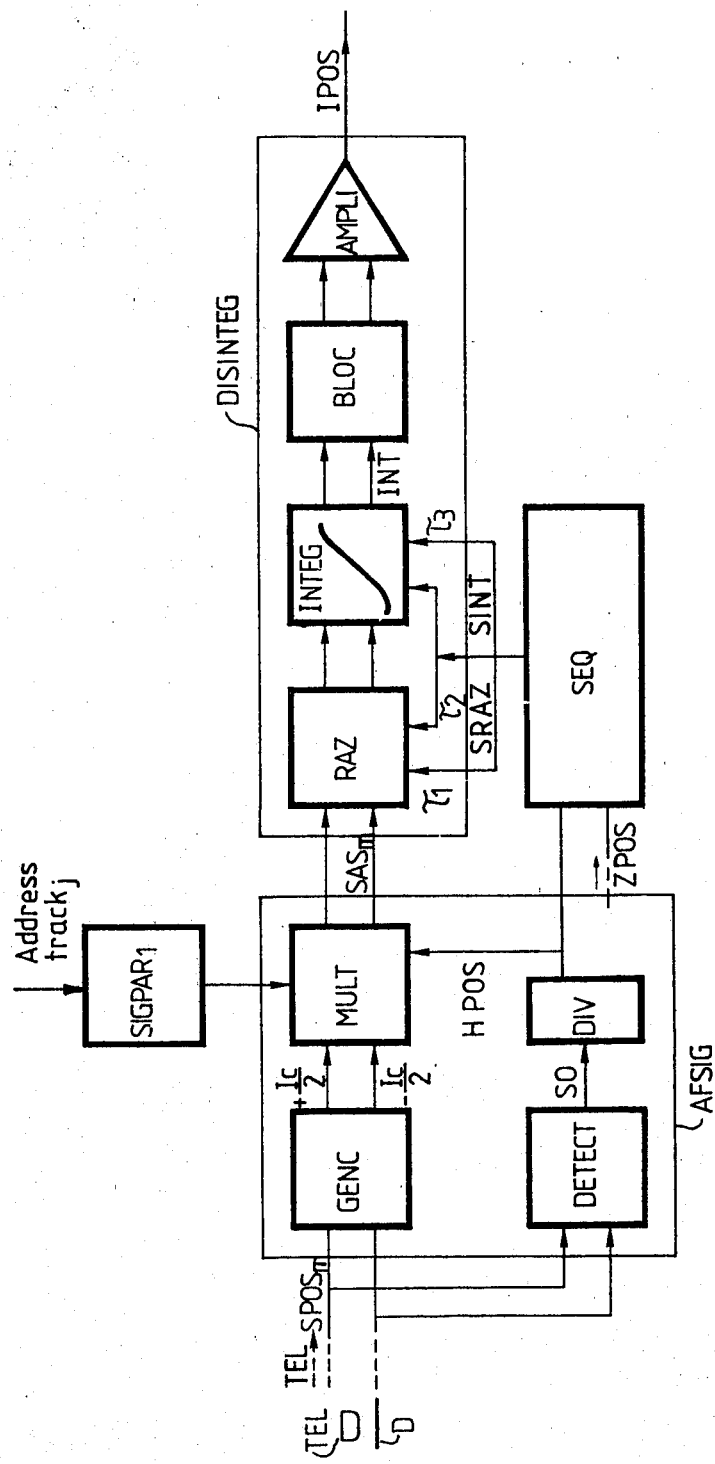
FIGS. 8a and 8b are block diagrams of first and second embodiments of an apparatus in accordance with the present invention which performs the method of the invention.

An apparatus for performing the rectification illustrated in FIGS. 6a and 6b and the integration indicated in FIG. 7 is illustrated in FIG. 8a. The apparatus of FIG. 8a includes a network AFSIG respective to signal $SPOS_m$ derived from head TEL for deriving signal $SAS_m$ and a square wave having a period equal to the duration of two of cells $C_1$, $C_2$ . . . $C_{12}$, i.e., equal to the period of one cycle of signal $SPOS_m$. Network AFSIG thus assigns a first and a second sign determined by the pulses of the even and odd parts $S_1$ and $S_2$ of signal $SPOS_m$. The circuit of FIG. 8a also includes a circuit $SIGPAR_1$ responsive to a conventionally derived signal indicative of the number of the address where head TEL is located. Circuit $SIGPAR_1$ responds to the signal indicative of the address zone where head TEL is located to derive a binary signal having zero and one values respectively indicative of the axis in the neighborhood of the head being an even or odd number. Signal SPAR derived from circuit $SIGPAR_1$ is supplied to network AFSIG, where it is combined with signals derived in response to signal $SPOS_m$, to derive signal $SAS_m$.

Output signal $SAS_m$ of network AFSIG is supplied to integration device DISINTEG which is reset and initialized in response to signals SRAZ and SINT derived from sequencer SEQ, in turn responsive to output signal HPOS derived from network AFSIG and signal ZPOS derived from conventional circuitry associated with head TEL. Integration device DISINTEG derives an analog signal having a magnitude proportional to the integral IPOS. Device DISINTEG integrates signal $SAS_m$ over an integration interval $\tau_3-\tau_2$ (FIG. 9) equal to an integral number of periods P. In a preferred embodiment, the integral number of periods P is equal to four. The magnitude of the integral indicating signal IPOS derived from device DISINTEG is designated $IPOS_{ij}$ in response to head TEL being responsive to magnetic flux variations in reference zones $ZRP_{ij}$ and $ZRP_{i(j+1)}$ of sector $S_i$, i.e., in response to the head being in the neighborhood of a reference position defined by axis $Ax_j$.

Figure 9:
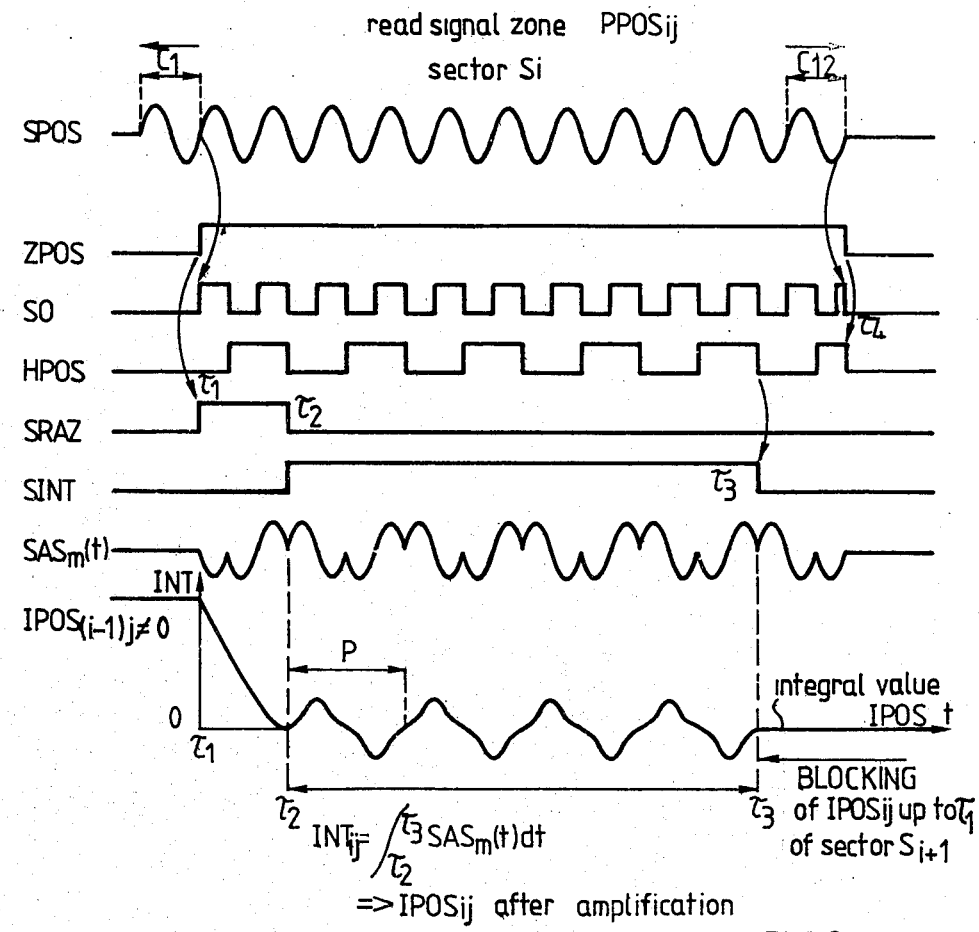
FIG. 9 includes several waveforms derived from the elements illustrated in FIGS. 8a and 8b.

The signal designated by $IPOS_{ij}$ is coupled to a servo-control device for the position of head TEL of a computer memory of which disc D is a part. The signal designated by $IPOS_{ij}$ is blocked by device DISINTEG during the interval from time $\tau_3$ until the time when head TEL faces the initial portions of parts $PPOS_{(i+1)j}$ and $PPOS_{(i+1)(j+1)}$ of zones $ZRP_{(j+1)i}$ and $ZRP_{(i+1)(j+1)}$ of sector $S_{(i+1)}$ which follows sector $S_i$; this initial time is designated $\tau_1$. At time $\tau_1$ device DISINTEG is returned to zero, i.e., any storage devices (such as capacitors) in integrating device DISINTEG are returned to zero. The storage devices in integrating device DISINTEG remain at a zero state in the interval defined by time $\tau_1$ to $\tau_2$ (FIGS. 7 and 9). In the interval between $\tau_2$ and $\tau_3$, signal $SAS_m$ is derived from network AFSIG in response to head TEL translating past all of cells $C_3-C_9$, as well as the latter half of cell $C_2$ and the first half of cell $C_{10}$. The interval between times $\tau_1$ and $\tau_2$ exists while signal $SAS_m$ is being derived in response to undulations in all of cell $C_1$ and the first half of cell $C_2$.

Sequencer SEQ defines the times $\tau_1$, $\tau_2$ and $\tau_3$. Sequencer SEQ is controlled by signal ZPOS, a rectangular waveform having a binary one value during an interval defined by times $\tau_4$ and $\tau_1$ equal to the time required for parts $PPOS_{ij}$ and $PPOS_{i(j+1)}$ to move past head TEL, i.e., the interval defined by times $\tau_4$ to $\tau_1$ is equal to the time required to read signals from parts $PPOS_{ij}$ and $PPOS_{i(j+1)}$. Sequencer SEQ is also responsive to signal HPOS derived from network AFSIG. Signal HPOS includes a square wave portion having positive and negative going transitions synchronized with negative going zero crossings of signal SPOS in response to the portions of signal SPOS that are derived in response to head TEL traversing past cells $C_2-C_{12}$. Signal HPOS includes a final negative going transition that is synchronized with the transition of signal SPOS from an undulating waveform derived in response to cell $C_{12}$ to the next portion of sector $S_{(i+1)}$; time $\tau_4$ occurs at this instant. Signal ZPOS is also derived in response to signal SPOS and has a binary zero value except during the interval while signal SPOS is undulating in response to cells $C_2-C_{12}$. Sequencer SEQ responds to signals HPOS and ZPOS to derive signals SRAZ and SINT, FIG. 9. Signal SRAZ has a binary one value in the interval between times $\tau_1$ and $\tau_2$, while signal SINT has a binary one value in the interval between times $\tau_2$ and $\tau_3$. At all other times, signals SRAZ and SINT have binary zero values. The logic circuitry included in sequencer SEQ necessary to derive signals SRAZ and SINT is obvious to one of ordinary skill in the art and therefore need not be specifically disclosed herein. Network AFSIG for deriving signals $SAS_m$, HPOS and ZPOS includes a constant current source GENC which supplies positive and negative currents $I_c/2$ and $-I_c/2$ proportional to the amplitude of the instantaneous voltage of signal $SPOS_m$ to multiplier MULT, also responsive to signal SPAR, as derived from circuit $SIGPAR_1$. Current generator GENC functions in a differential mode to simultaneously derive currents $+I_c/2$ and $-I_c/2$ at differential output terminals thereof. Multiplier MULT responds to signals SPAR, HPOS, $+I_c/2$ and $-I_c/2$ to derive signal $SAS_m$, having the waveforms illustrated in FIGS. 6a and 6b for exemplary situations. Details of multiplier MULT are described infra in connection with FIG. 10.

Zero value detector DETECT of network AFSIG responds to signal $SPOS_m$ to derive signal SO having a square wave portion with leading and trailing edges respectively synchronized with positive and negative going zero crossings of signal SPOS, as derived in response to the flux variations of cells $C_2-C_{11}$, as well as in response to the first half of the undulation of cell $C_{12}$. Signal SO also includes a short duration pulse that is derived in response to the transition in the undulation in signal SPOS at the end of cell $C_{12}$, from a sinusoidal variation to a constant value.

Output signal SO of zero value detector DETECT is supplied to frequency divider DIV which reduces the frequency of square wave signal SO by a factor of 2, to derive signal HPOS. Signal HPOS is applied in parallel to multiplier MULT and sequencer SEQ. Multiplier MULT responds to the output currents of constant current source GENC and to signals SPAR and HPOS to derive signal $SAS_m$ as indicated in FIGS. 6a and 6b in response to signal SPAR repsectively indicating that the axis in the neighborhood of head TEL is respectively an odd and even numbered track. Thus, multiplier MULT responds to an indication from signal SPAR that head TEL is in the neighborhood of an odd numbered axis to multiply the first and second pulses of even numbered cells by positive and negative reference values, e.g., $+1$ and $-1$, and to multiply the first and second pulses of odd numbered cells by negative and positive reference values, e.g., $-1$ and $+1$. In response to signal SPAR indicating that head TEL is in the neighborhood of an even numbered axis, multiplier MULT multiplies the first and second pulses of odd numbered cells by $+1$ and $-1$, respectively, and multiplies the first and second pulses of even numbered cells by $-1$ and $+1$, respectively.

Figure 10:
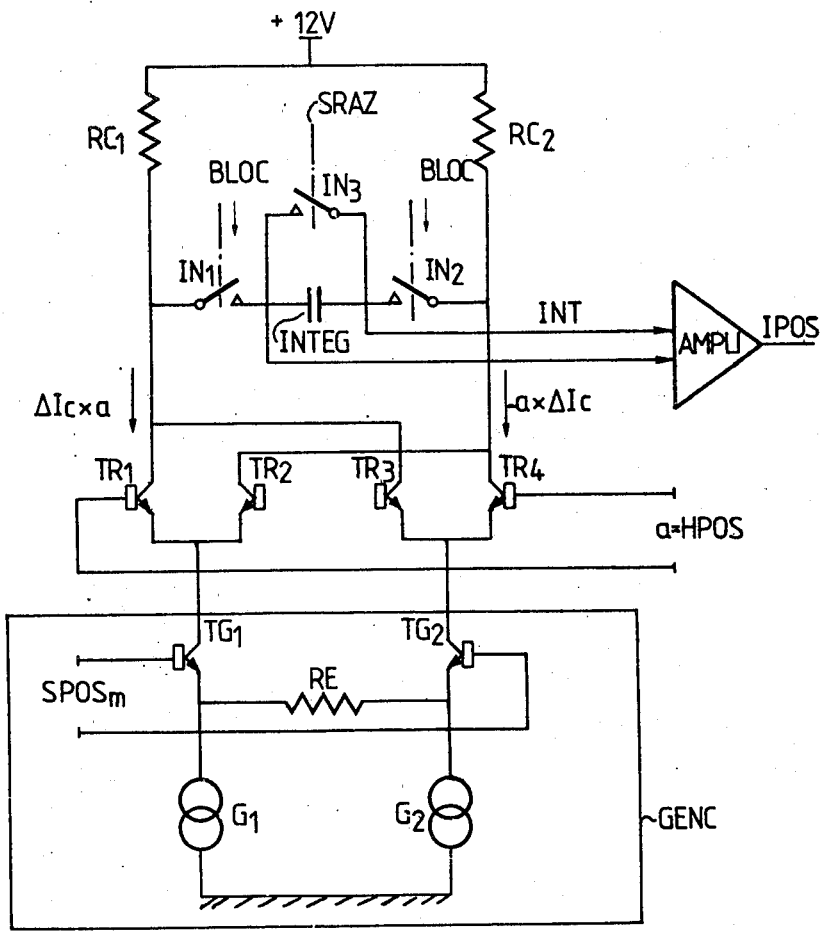
FIG. 10 is a circuit diagram of part of the devices illustrated in FIGS. 8a and 8b.

Integration device DISINTEG, which is illustrated in block form, in FIG. 8a but is illustrated in detail in FIG. 10, includes an integrator INTEG which is responsive to signal $SAS_m$. Integrator INTEG is also responsive to a return to zero signal derived from network RAZ and to signal SINT which commands the integrator to be in an integrating mode. Signal SRAZ controls integrator INTEG to be returned to zero in the interval between times $\tau_1$ and $\tau_2$, while signal SINT causes the integrator to be operational during the interval between times $\tau_2$ and $\tau_3$. Integrator INTEG responds to signals SRAZ, SINT and $SAS_m$ to derive an output signal INT. To this end, integrator INTEG includes a capacitor that is charged over the interval $\tau_2-\tau_3$ by the constant current derived at one of the output terminals of generator GENC, as coupled through multiplier MULT. Output signal INT of integrator INTEG to amplifier AMPLI which derives output signal IPOS is controlled by blocking device BLOC. In response to the reference position being defined by axis $Ax_j$ in connection with a track of serial number j and head TEL being responsive to magnetic undulations in adjacent reference zones $ZRP_{ij}$ and $ZRP_{i(j+1)}$ of sector $S_1$, the output signal of integrator INTEG is designated by $INT_{ij}$, while the output signal of amplifier AMPLI is designated by $IPOS_{ij}$. The evolution as a function of time of signal $INT_{ij}$ and $IPOS_{ij}$ is identical, and indicated in FIG. 9 as a waveform having a monotonic slope between times $\tau_1-\tau_2$. In the interval between times $\tau_2$ and $\tau_3$, signal IPOS varies in response to the undulations of signal $SAS_m$, with a period P. After time $\tau_3$, signal IPOS is coupled to a servo-controller (not shown) to translate head TEL toward the reference position by an amount commensurate with the value of IPOS. The head translation occurs immediately after the sector which caused signal IPOS to be derived; for example, if signal IPOS was derived in response to cells $C_1$-$C_{12}$ in sector $S_i$, head TEL is translated immediately after cell $C_{12}$ of sector $S_{(i+1)}$ has been read. To this end, blocking device BLOC assures that a constant output is coupled from integrator INTEG to amplifier AMPLI from time $\tau_3$ to the beginning of the next sequence of positional cells, i.e., from time $\tau_3$ associated with sector $S_i$ to time $\tau_1$ in sector $S_{(i+1)}$.

Figure 8B:
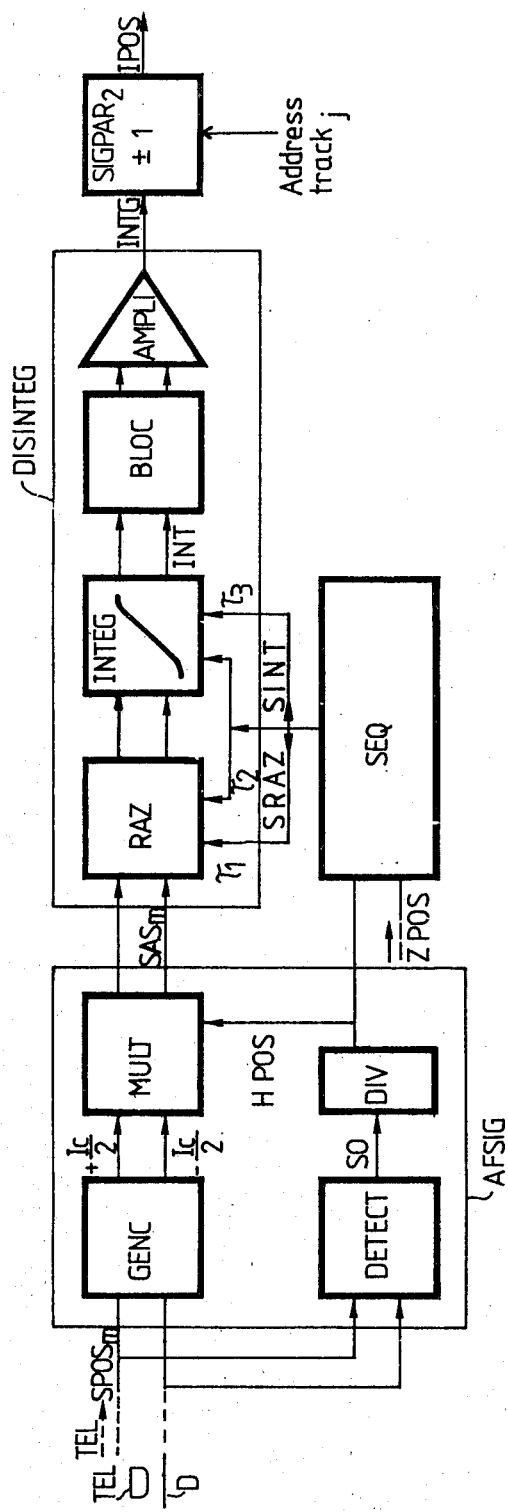

In accordance with a second embodiment of the invention, as illustrated in FIG. 8b, circuit $SIGPAR_1$, FIG. 8a, is replaced by circuit $SIGPAR_2$, responsive to output signal INTEG of amplifier AMPLI. Circuit $SIGPAR_2$ selectively multiplies signal INTG by a predetermined positive or negative constant value in response to whether head TEL is in the neighborhood of an even or odd numbered axis; preferably, the predetermined constant is one, whereby signal INTG is selectively inverted or not inverted, to derive signal IPOS. To this end, circuit $SIGPAR_2$ is responsive to a binary signal indicative of the address of track j.

Regardless of whether the axis defining the reference position is associated with an even or odd numbered track, signal $SAS_m$ is such that the pulses of part $S_1$ are considered as negative, corresponding to cells $C_2$, $C_4$... $C_{12}$, while the pulses of odd part $S_2$ are considered as positive and correspond to cells $C_1$, $C_3$... $C_{11}$. The polarities of the pulses associated with the pulses of parts $S_1$ and $S_2$ are selected as indicated in FIGS. 6a and 6b. Thus, if axis $Ax_j$ defines the reference position of an even numbered track, signal INTG (FIG. 8b) derived by integration device DISINTEG is a function of the position of head TEL as represented by the straight line solid curve C in FIG. 7; curve C is also representative of output signal INT of integrator INTEG. If, however, the reference position is axis $Ax_{(j-1)}$ or $Ax_{(j+1)}$, which corresponds to a track having an odd number, the output signal INTG of integrator device DISINTEG, as well as the output signal INT of integrator INTEG, is represented in FIG. 7 by the dashed straight line $C_2$. Curves $C_1$ and $C_2$ are symmetrical with respect to each other and the axial position $POS_2$ of head TEL. Curves $C_1$ and $C_2$ are both symmetrical with a signal magnitude IPOS of zero. Circuit $SIGPAR_2$ thus multiplies signal INTG by $+1$ and $-1$ in response to the axis defining the reference position corresponding to tracks of even and odd numbers, respectively. The output signal of circuit $SIGPAR_2$ is signal IPOS which is represented by curve $C_1$, FIG. 7.

Reference is now made to FIG. 10 of the drawing, a detailed circuit diagram of various devices illustrated in FIGS. 8a and 8b, viz: of current generator GENC, multiplier MULT, return to zero device RAZ, integrator INTEG and blocking device BLOC.

Constant current generator GENC includes identical constant current sources $G_1$ and $G_2$ that derive equal bias currents in response to signal $SPOS_m$ being equal to a zero voltage. Current generators $G_1$ and $G_2$ are connected in the emitter collector paths of npn transistors $TG_1$ and $TG_2$, respectively. Transistors $TG_1$ and $TG_2$ are connected so that the emitters thereof are directly coupled to opposite terminals of head TEL which derives signal $SPOS_m$. The emitters of transistors $TG_1$ and $TG_2$ are connected together by resistor RE, whereby the collector currents of transistors $TG_1$ and $TG_2$ vary differentially about a reference value associated with signal $SPOS_m$ having a zero value, thereby to derive currents $+I_c/2$ and $-I_c/2$.

The currents derived from constant current generator GENC are applied to multiplier MULT that includes two pairs of identical transistors $TR_1$-$TR_2$ and $TR_3$-$TR_4$. The emitters of transistors $TR_1$ and $TR_2$ are connected together and to the collector of transistor $TG_2$. The collectors of transistors $TR_1$ and $TR_3$ are connected together and to one terminal of resistor $RC_1$, having a second terminal connected to a positive DC power supply source; the collectors of transistors $TR_2$ and $TR_4$ are similarly connected together and to one terminal of resistor $RC_2$, having a second terminal connected to the DC power supply. The bases of transistors $TR_1$ and $TR_4$ are differentially responsive to signal HPOS. Signal HPOS causes one of transistors $TR_1$ or $TR_4$ to be in a conducting state while the other transistor is in a cut-off state.

The common collectors of transistors $TR_1$ and $TR_3$, as well as the common collectors of transistors $TR_2$ and $TR_4$, are responsive to a current $a(\Delta I_c)$, where a is a gain factor of transistors $TR_1$ and $TR_4$, $\Delta I_c = K_a v(SPOS) + I_0$, where $I_0$ is a constant, $K_a$ is equal to $\alpha(RE)$, $\alpha$ is a proportionality coefficient, and v(SPOS) is the voltage associated with signal $SPOS_m$. Integrator INTEG comprises a capacitor having opposite electrodes selectively connected to the collectors of transistors $TR_1$ and $TR_4$ by switches $IN_1$ and $IN_2$; switches $IN_1$ and $IN_2$ are preferably field effect transistors. Switches $IN_1$ and $IN_2$ are controlled by blocking device BLOC. Switches $IN_1$ and $IN_2$ are simultaneously closed during the time interval between times $\tau_2$ and $\tau_3$ during which integration of signal $SAS_m$ occurs, as described in connection with FIG. 7. Contacts of switches $IN_1$ and $IN_2$ are opened at time $\tau_3$ and remain open until $\tau_4$, at which time the integration of signal $SAS_m$, derived by multiplier MULT, commences. Time $\tau_1$ occurs when head TEL faces parts $PPOS_{(i+1)j}$ and $PPOS_{(i+1)(j+1)}$ of reference zones $ZRP_{(i+1)j}$ and $ZRP_{(i+1)(j+1)}$ of sector $S_{(i+1)}$ which follows sector $S_i$ on the face of disc D. Similarly, times $\tau_2$ and $\tau_3$ occur when head TEL faces parts $PPOS_{ij}$ and $PPOS_{i(j+1)}$ of reference zones $ZRP_{ij}$ and $ZRP_{i(j+1)}$ respectively of the same sector $S_i$.

Connected in parallel with the capacitor of integrator INTEG is switch $IN_3$. Switch $IN_3$ is controlled by return to zero signal SRAZ, such that the switch is closed during the interval between times $\tau_1$ and $\tau_2$, to short circuit the capacitor of integrator INTEG; discharging the capacitor causes the voltage between the capacitor electrodes to be zero. The signal between the electrodes of the capacitor of integrator INTEG is coupled to input terminals of amplifier AMPLI which derives output signal IPOS.

While there have been described and illustrated several specific embodiments of the invention, it will be clear that variations in the details of the embodiments specifically illustrated and described may be made without departing from the true spirit and scope of the invention as defined in the appended claims.

I claim:

1. A method of detecting the transverse position of a transducer head relative to a reference position defining a longitudinal axis between longitudinally extending adjacent tracks, each of said tracks including a plurality of longitudinally extending, equal length cells, like numbered cells of said tracks having aligned boundaries, said tracks being translated longitudinally relative to said transducer, said cells having physical variations and said transducer being responsive to the variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, the method comprising responding to the waveforms so that both pulses of each odd numbered cell have one of the polarities and both pulses of each even numbered cell have the other polarity while substantially retaining the shape and amplitude of the pulses to derive a resulting waveform, and integrating the resulting waveform over an integral number of the cells to derive an indication of the transverse position.

2. A method of detecting the transverse position of a transducer head relative to reference positions defining even and odd numbered longitudinal axes between longitudinally extending adjacent tracks, each of said tracks including a plurality of longitudinally extending, equal length cells, like numbered cells of said tracks having aligned boundaries, said tracks being translated longitudinally relative to said transducer, said cells having physical variations and said transducer being responsive to the variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, the method comprising determining whether the transducer is in the neighborhood of an even or odd numbered axis, responding to the even or odd numbered determination and the waveforms so that both pulses of each odd numbered cell have one of the polarities and both pulses of each even numbered cell have the other polarity while substantially retaining the shape and amplitude of the pulses to derive a resulting waveform, and integrating the resulting waveform over an integral number of the cells to derive an indication of the transverse position relative to the axis in the transducer neighborhood.

3. The method of claim 2 wherein the resulting waveform of the responding step is derived so both pulses of the odd numbered cells in the resulting waveform are of a first polarity and both pulses of the even numbered cells in the resulting waveform are of a second, different polarity when the transducer is in the neighborhood of an even numbered axis, and both pulses of the odd numbered cells in the resulting waveform are of the second polarity and both pulses of the even numbered cells in the resulting waveform are of the first polarity when the transducer is in the neighborhood of an odd numbered axis.

4. The method of claim 1, 2 or 3 wherein the physical variations are magnetic flux polarity transitions, said transducer being a magnetic head that derives the waveforms in response to changes of the magnetic flux polarity transitions, the even and odd numbered cells in a first of the tracks respectively including an even number of first and second transitions, the odd and even numbered cells in a second track abutting the first track respectively including the even number of first and second transitions, zero being included as the number of the first and second transitions, the first and second numbers differing from each other.

5. The method of claim 4 wherein the physical variations are recorded on a magnetic disc having plural concentric ones of said tracks.

6. Apparatus for detecting the transverse position of a transducer head relative to a reference position defining a longitudinal axis between longitudinally extending adjacent tracks, each of said tracks including a plurality of longitudinally extending, equal length cells, like numbered cells of said tracks having aligned boundaries, said tracks being translated longitudinally relative to said transducer, said cells having physical variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, the apparatus comprising means responsive to the waveforms for selectively altering the pulses so that both pulses of each odd numbered cell have one of the polarities and both pulses of each even numbered cell have the other polarity while substantially retaining the shape and amplitude of the pulses to derive a resulting waveform, and means for integrating the resulting waveform over an integral number of the cells to derive an indication of the transverse positions.

7. Apparatus for detecting the transverse position of a transducer head relative to reference positions defining even and odd numbered longitudinal axes between longitudinally extending adjacent tracks, each of said tracks including a plurality of longitudinally extending, equal length cells, like numbered cells of said tracks having aligned boundaries, said tracks being translated longitudinally relative to said transducer, said cells having physical variations and said transducer being responsive to the variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, the apparatus comprising means for determining whether the transducer is in the neighborhood of an even or odd numbered axis, means responsive to the even or odd numbered determination and the waveforms for selectively altering the pulses so that both pulses of each odd numbered cell have one of the polarities and both pulses of each even numbered cell have the other polarity while substantially retaining the shape and amplitude of the pulses to derive a resulting waveform, and means for integrating the resulting waveform over an integral number of the cells to derive an indication of the transverse position relative to the axis in the transducer neighborhood.

8. In combination, a transducer head, a record with physical variations to which the transducer is responsive, said record including a reference position defining a longitudinal axis between longitudinally extending adjacent tracks, each of said tracks including a plurality of longitudinally extending, equal length cells, like numbered cells of said tracks having aligned boundaries, means for translating said tracks longitudinally relative to said transducer, said cells having physical variations and said transducer being responsive to the variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, means responsive to the waveforms for selectively altering the pulses so that both pulses of each odd numbered cell have one of the polarities and both pulses of each even numbered cell have the other polarity while substantially retaining the shape and amplitude of the pulses to derive a resulting waveform, and means for integrating the resulting waveform over an integral number of the cells to derive an indication of the transverse position.

9. In combination, a transducer head, a record with physical variations to which the transducer is responsive, said record including reference positions defining even and odd numbered longitudinal axes between longitudinally extending adjacent tracks, each of said tracks including a plurality of longitudinally extending, equal length cells, like numbered cells of said tracks having aligned boundaries, means for translating said tracks longitudinally relative to said transducer, said cells having physical variations and said transducer being responsive to the variations in the cells of both tracks so that the transducer derives a series of sequential waveforms respectively having first and second like amplitudes and shapes for even and odd numbered cells as the tracks are translated relative to the head, the waveforms for each of the odd numbered cells including successive equal first amplitude pulses of first and second different polarities, the waveforms for each of the even numbered cells including successive equal second amplitude pulses of first and second different polarities, the number of pulses and the approximate shapes of the pulses for the even and odd numbered cells being the same, the first and second amplitudes being indicative of the transverse position of the transducer relative to the axis, means for determining whether the transducer is in the neighborhood of an even or odd numbered axis, means responsive to the even or odd numbered determination and the waveforms for selectively altering the pulses so that both pulses of each odd numbered cell have one of the polarities and both pulses of each even numbered cell have the other polarity while substantially retaining the shape and amplitude of the pulses to derive a resulting waveform, and means for integrating the resulting waveform over an integral number of the cells to derive an indication of the transverse position relative to the axis in the transducer neighborhood.

10. The apparatus of claim 9 wherein both pulses of the odd numbered cells in the resulting waveform are of a first polarity and both pulses of the even numbered cells in the resulting waveform are of a second, different polarity when the transducer is in the neighborhood of an even numbered axis, and both pulses of the odd numbered cells in the resulting waveform are of the second polarity and both pulses of the even numbered cells in the resulting waveform are of the first polarity when the transducer is in the neighborhood of an odd numbered axis.

11. The apparatus of claim 6, 7, 8, 9 or 10 wherein the physical variations are magnetic flux polarity transitions on the record, said transducer being a magnetic head coupled to the record to derive the waveforms in response to changes of the magnetic flux polarity transitions of the record, the even and odd numbered cells in a first of the tracks respectively including an even number of first and second transitions, the odd and even numbered cells in a second track abutting the first track including an even number of first and second transitions, zero being included as the number of the first and second transitions, the first and second numbers differing from each other.

12. The apparatus of claim 11 wherein the record is a magnetic disc having plural concentric ones of said tracks recorded thereon.

13. The apparatus of claim 11 wherein the means for selectively altering includes means responsive to the axis determination for multiplying the amplitude of one of the pulses associated with each cell by a predetermined amplitude of a first polarity and for multiplying the amplitude of the other pulse associated with each cell by the same predetermined amplitude of the second polarity.

14. A method for measuring the position of a read/write head with respect to a reference position of a data carrier including a plurality of tracks, each of said tracks including a sub-unit for positional data recorded within groups of reference zones, each track being associated with at least two reference zones, the reference position being defined by at least one boundary between adjacent even and odd zones, the head being translated relative to the positional data in the neighborhood of the boundary to derive a signal equal to the algebraic sum of an even part $S_1$ and an odd part $S_2$, the even and odd parts having the same period and being shifted in time with respect to each other, the even and odd parts corresponding respectively to signals indicative of positional data of the even and odd zones, said method comprising:

(a) assigning all pulses of even part $S_1$ the same first predetermined polarity and all pulses of odd part $S_2$ the same second predetermined polarity which is opposite to the first polarity, thereby to derive a signal SAS having a period P, and (b) calculating the integral of signal SAS over an integration interval extending over N consecutive periods where N is an integer, the integration interval being no greater than the time to read the positional data in the zones, the calculated integral having a predetermined value for the reference position of the head, the position occupied by the head with respect to the reference position being defined by the value of the calculated integral.

15. The method of claim 14 wherein the data carrier is magnetic disc having data distributed on a face thereof in a plurality of adjacent sectors, two adjacent even and odd reference zones being associated with each track in each sector, the even and odd parts $S_1$ and $S_2$ of the signal derived by the head being time displaced relative to each other by P/2 such that the calculated integral of signal SAS is zero when the head occupies the reference position and the calculated integral of signal SAS has a polarity and amplitude indicative of the deviation of the head from the reference position and blocking the value of the integral at the end of the integration interval.

16. Apparatus for measuring the position of a read/write head with respect to a reference position of a data carrier including a plurality of tracks, each of said tracks including a sub-unit for positional data recorded within groups of reference zones, each track being associated with at least two reference zones, the reference position being defined by at least one boundary between adjacent even and odd zones, the head being translated relative to the positional data in the neighborhood of the boundary to derive a signal equal to the algebraic sum of an even part $S_1$ and an odd part $S_2$, the even and odd parts having the same period P and being shifted in time with respect to each other, the even and odd parts corresponding respectively to signals indicative of positional data of the even and odd zones, said apparatus comprising: means responsive to the odd and even parts of the signal derived by the head for causing all pulses of even part $S_1$ to have the same first predetermined polarity and all pulses of odd part $S_2$ to have a second predetermined polarity which is opposite to the first polarity, thereby to derive a signal SAS having a period P, and means responsive to the pulses of even and odd parts $S_1$ and $S_2$ for integrating the pulses over an integration interval extending over N periods where N is an integer, the integration interval having a maximum duration equal to the time required for the positional data of the zones to be read by the head, the last named means thereby deriving an integrated value indicative of the head position relative to the reference position.

17. The apparatus of claim 16 further including means for clocking the means for integrating during the integration interval.

18. The apparatus of claim 16 further including a sequencer responsive to signal SAS for resetting the means for integrating after each integration interval has been completed and prior to the beginning of the subsequent interval and enabling the means for integrating during the integration interval.

19. The apparatus of claim 16 further including means for adjusting the polarities of the pulses of parts $S_1$ and $S_2$ in response to a signal indicative of the serial number of a track having an axis coinciding with the boundary between the adjacent even and odd zones.

20. The apparatus of claim 19 wherein the means for adjusting includes a signal multiplier for selectively inverting and not inverting the magnitude of a current derived from a current source proportional to positional output data of the head.

21. The apparatus of claim 19 wherein the means for adjusting includes means for selectively inverting and not inverting the output of the means for integrating in response to the serial number of the track having an axis coinciding with the boundary between the two adjacent even and odd zones.

* * * * *